(12) United States Patent
Sliz et al.

(10) Patent No.: US 10,587,796 B1
(45) Date of Patent: Mar. 10, 2020

(54) TECHNOLOGY FOR AUTOMATICALLY ENSURING CONSISTENT DIGITAL IMAGE CAPTURE PARAMETERS

(71) Applicant: STATE FARM MUTUAL AUTOMOBILE INSURANCE COMPANY, Bloomington, IL (US)

(72) Inventors: Bradley A. Sliz, Normal, IL (US); Lucas Allen, East Peoria, IL (US); Jeremy T. Cunningham, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 93 days.

(21) Appl. No.: 15/900,110

(22) Filed: Feb. 20, 2018

Related U.S. Application Data

(60) Provisional application No. 62/483,786, filed on Apr. 10, 2017, provisional application No. 62/473,014, filed on Mar. 17, 2017, provisional application No. 62/468,806, filed on Mar. 8, 2017, provisional application No. 62/463,371, filed on Feb. 24, 2017.

(51) Int. Cl.
*G06K 9/62* (2006.01)
*H04N 5/232* (2006.01)
*G06T 7/00* (2017.01)

(52) U.S. Cl.
CPC ....... *H04N 5/23222* (2013.01); *G06K 9/6202* (2013.01); *G06K 9/6215* (2013.01); *G06T 7/0002* (2013.01)

(58) Field of Classification Search
CPC ............. H04N 5/23222; G06K 9/6202; G06K 9/6215; G06T 7/0002
See application file for complete search history.

(56) References Cited

U.S. PATENT DOCUMENTS

| 8,259,161 | B1 * | 9/2012 | Huang | G03B 35/02 348/50 |
| 2005/0270381 | A1 * | 12/2005 | Owens | H04N 5/23222 348/222.1 |
| 2011/0058802 | A1 * | 3/2011 | Forutanpour | H04N 5/232 396/225 |
| 2011/0229043 | A1 * | 9/2011 | Kuraki | G06T 7/0002 382/218 |
| 2011/0249910 | A1 * | 10/2011 | Henderson | G06K 9/00134 382/278 |
| 2015/0156419 | A1 * | 6/2015 | Aggarwal | H04N 5/23222 348/208.1 |

(Continued)

*Primary Examiner* — Carol Wang
(74) *Attorney, Agent, or Firm* — Marshall, Gerstein & Borun LLP

(57) ABSTRACT

Systems and methods for analyzing image data to automatically ensure image capture consistency are described. According to certain aspects, a server may access aerial and other image data and identify a set of parameters associated with the capture of the image data. The server may access a corresponding set of acceptable image capture parameters, and may compare the set of parameters to the set of acceptable parameters to determine whether image data is consistent with the set of acceptable parameters. In some embodiments, if the image data is not consistent, the server may generate a notification or instruction to cause an image capture component to recapture additional image data.

18 Claims, 5 Drawing Sheets

(56) References Cited

U.S. PATENT DOCUMENTS

| | | | |
|---|---|---|---|
| 2016/0148383 A1* | 5/2016 | Cerqueira | G06F 16/50 |
| | | | 382/194 |
| 2016/0182801 A1* | 6/2016 | Luk | H04N 5/23206 |
| | | | 348/207.11 |
| 2016/0284095 A1* | 9/2016 | Chalom | H04N 5/23229 |
| 2017/0053094 A1* | 2/2017 | Hoenick | G06F 19/3456 |
| 2017/0097236 A1* | 4/2017 | Bender | G01C 11/06 |
| 2017/0140466 A1* | 5/2017 | Kukreja | G06K 19/042 |
| 2017/0256051 A1* | 9/2017 | Dwivedi | G06T 7/11 |
| 2017/0336806 A1* | 11/2017 | Blanc-Paques | G08G 5/045 |
| 2018/0055440 A1* | 3/2018 | Ming | H04N 13/204 |

* cited by examiner

TECHNOLOGY FOR AUTOMATICALLY ENSURING CONSISTENT DIGITAL IMAGE CAPTURE PARAMETERS

CROSS-REFERENCE TO RELATED APPLICATIONS

This application claims benefit of the filing dates of U.S. Provisional Patent Application No. 62/463,371 (filed Feb. 24, 2017 and entitled "TECHNOLOGY FOR ANALYZING IMAGE DATA TO AUTOMATICALLY ASSESS CUSTOMER OPPORTUNITIES"); U.S. Provisional Patent Application No. 62/468,806 (filed Mar. 8, 2017 and entitled "TECHNOLOGY FOR AUTOMATICALLY ENSURING CONSISTENT DIGITAL IMAGE CAPTURE PARAMETERS"); U.S. Provisional Patent Application No. 62/473,014 (filed Mar. 17, 2017 and entitled "TECHNOLOGY FOR ANALYZING IMAGE DATA TO AUTOMATICALLY PROCESS CUSTOMER RENEWALS"); and U.S. Provisional Patent Application No. 62/483,786 (filed Apr. 10, 2017 and entitled "TECHNOLOGY FOR ANALYZING IMAGE DATA TO AUTOMATICALLY MANAGE CUSTOMER POLICIES")—which are hereby incorporated by reference in their entireties.

TECHNICAL FIELD

The present disclosure is directed to analyzing image data to automatically ensure consistent digital image capture parameters. More particularly, the present disclosure is directed to systems and methods for analyzing digital image data to determine whether digital images were captured according to a set of parameters meant to ensure or improve consistency.

BACKGROUND

Aerial imagery generally includes image data that is captured from a vantage point located above an object that is depicted in the image data. The use of aerial imagery is increasing as the amount of devices and components used to capture aerial imagery increases. For instance, unmanned aerial vehicles (UAVs; i.e., "drones") and satellites are increasing in amount and usage. Generally, aerial imagery may be used in certain applications, such as supplementing mapping applications and creating graphical and video productions including promotional materials and movies.

Because aerial imagery may be captured by various components and in various conditions or circumstances, aerial imagery is often not consistent. For example, aerial imagery captured by satellites does not have the same level of detail as aerial imagery captured by drones. Entities that analyze and process aerial imagery are thus often not afforded the benefit of consistent image data, and certain applications may be limited or ineffective. Additionally, these entities have no way to automatically or dynamically request the recapture of aerial imagery.

Accordingly, there is an opportunity to automatically analyze image data to ensure or improve consistency with a set of parameters, and facilitate certain actions to recapture image data so that the recaptured image data is consistent with the set of parameters.

BRIEF SUMMARY

In one aspect, a computer-implemented method of analyzing image data to automatically ensure consistent image capture parameters may be provided. The method may include, via one or more processors, servers, sensors, and/or transceivers: (1) accessing a set of digital image data depicting an aerial view of an area; (2) identifying a set of image capture parameters from the set of digital image data; (3) accessing a set of baseline image capture parameters corresponding to at least a portion of the set of image capture parameters; (4) comparing at least the portion of the set of image capture parameters to the set of baseline image capture parameters; (5) based upon the comparing, determining that the set of digital image data is not consistent with the set of baseline image capture parameters; and/or (6) in response to the determining, generating a digital image recapture instruction according to how the set of digital image data is not consistent with the set of baseline image capture parameters. The method may include additional, less, or alternate actions, including those discussed elsewhere herein.

In another aspect, a computer system for analyzing image data to automatically ensure consistent image capture parameters may be provided. The system may include a memory configured to store non-transitory computer executable instructions, and a processor interfacing with the memory, and configured to execute the non-transitory computer executable instructions to cause the processor to: (1) access a set of digital image data depicting an aerial view of an area; (2) identify a set of image capture parameters from the set of digital image data; (3) access a set of baseline image capture parameters corresponding to at least a portion of the set of image capture parameters; (4) compare at least the portion of the set of image capture parameters to the set of baseline image capture parameters; (5) based upon the comparing, determine that the set of digital image data is not consistent with the set of baseline image capture parameters; and/or (6) in response to the determining, generate a digital image recapture instruction according to how the set of digital image data is not consistent with the set of baseline image capture parameters.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment of thereof. Further, wherever possible, the following description refers to the reference numerals included in the following figures, in which features depicted in multiple figures are designated with consistent reference numerals.

DETAILED DESCRIPTION

Figure 1:
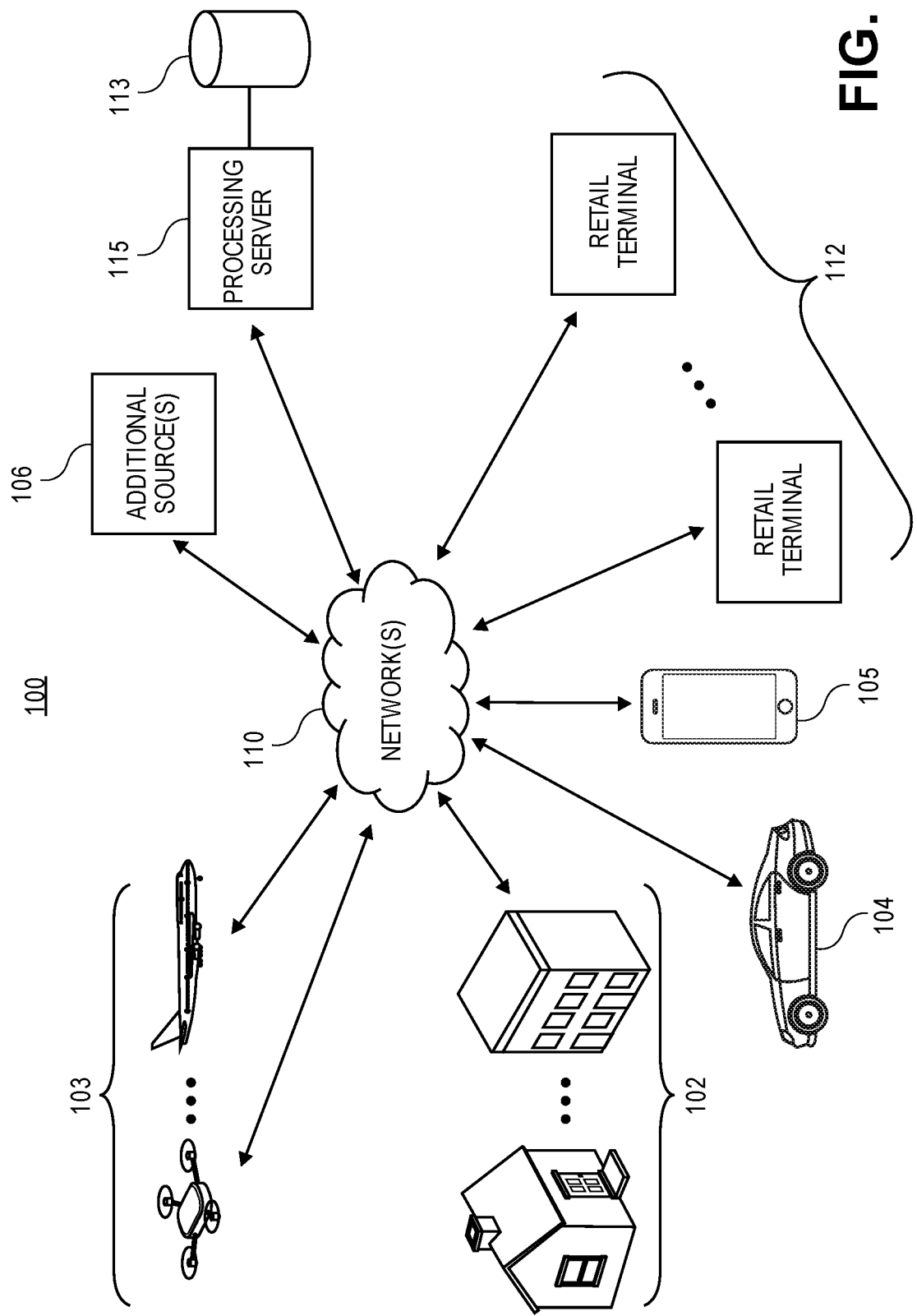
FIG. 1 depicts an overview of an exemplary computer system of components configured to facilitate various functionalities, in accordance with some embodiments.

The present embodiments may relate to, inter alia, technology for analyzing image data to automatically ensure consistent digital image capture parameters. Aerial images are conventionally used for various applications and processes, where certain components and parameters of the aerial image data are varied depending on the component that captured the aerial image data, the conditions of the capture, and/or other factors. Because of this, the results of the image analyses are often inconsistent. To alleviate these shortcomings, the present embodiments analyze captured aerial image data to effectively and efficiently assess whether the aerial image data is consistent with a set of baseline parameters.

According to certain aspects, systems and methods may retrieve or otherwise access a set of digital image data, where in some embodiments the digital image data may depict an aerial view of an area or neighborhood in which a set of properties or other structures may be located. Although the digital image data may primarily or solely include aerials image, such as digital images acquired via airborne vehicles, in some embodiments, the digital image data may alternatively include digital images acquired via other sources, such as via cameras or video recorders mounted on homes, smart or autonomous vehicles, or mobile devices. In other words, the digital image data may include airborne vehicle image data, smart or intelligent home image data, smart or autonomous vehicle image data, and/or mobile device and/or social media image data.

The systems and methods may analyze the set of digital image data to identify parameters associated with the capture of the digital image data, and may access baseline parameters that correspond to the identified parameters. The systems and methods may compare the identified parameters of the digital image data to the baseline parameters to determine whether the identified parameters are consistent with the baseline parameters (i.e., whether the digital image data is consistent with parameters that may be considered acceptable). If the identified parameters are not consistent, the systems and methods may automatically facilitate the capture of additional digital image data that may also be analyzed for consistency.

The systems and methods therefore offer numerous benefits. In particular, instead of analyzing different sets of digital image data that is often inconsistent across each set, the systems and methods ensure that each set of digital image data is consistent with respect to a set of baseline parameters. This results in more effective image analysis and more effective applications of the image analysis. Additionally, the end users of the applications (e.g., customers) are afforded the benefit of more accurate analyses. It should be appreciated that additional benefits are envisioned.

The systems and methods discussed herein address a challenge that is particular to image data analysis. In particular, the challenge relates to a difficulty in ensuring consistency across sets of image data. This is particularly apparent in situations in which consistent image data improves the effectiveness and efficiency of certain applications (e.g., processing aerial image data). In conventional situations, entities process image data sets without accounting for inconsistencies and/or with no channel or ability to remedy inconsistent image data. In contrast, the systems and methods utilize network connections to effectively and efficiently ensure image data consistency and automatically facilitate the recapture of image data that is deemed to be inconsistent. Therefore, because the systems and methods employ the collection, analysis, and communication of image data, the systems and methods are necessarily rooted in computer technology in order to overcome the noted shortcomings that specifically arise in the realm of image data analysis.

According to certain implementations, the systems and methods may support a dynamic, real-time or near-real-time collection, analysis, and communication of any applicable data. In particular, the systems and methods may dynamically and automatically access image data from components in real-time or near-real-time, may automatically and dynamically analyze the image data, and may automatically and dynamically generate and transmit notifications or instructions resulting from the analyses in real-time or near-real-time. In this regard, individuals are afforded the benefit of effective and relevant image data analysis and retrieval in real-time or near-real-time.

Exemplary System and Components Thereof

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of properties 102, each of which may be any type of building, structure, or the like. For example, the properties 102 may be any single- or multi-unit house, flat, townhome, apartment building, condo building, commercial building, auxiliary building for a property (e.g., a garage), or the like. In one implementation, the properties 102 may be void of a physical structure, and may instead consist of an empty lot or land. FIG. 1 depicts two properties 102, however it should be appreciated that fewer or more properties are envisioned.

The system 100 may further include a set of aerial vehicles 103 capable of any type of air travel or flight. According to embodiments, the aerial vehicle(s) 103 may be unmanned aerial vehicles (UAVs; aka "drones") or may be manned by a pilot (e.g., airplane, helicopter, etc.). If the aerial vehicle(s) 103 is a UAV(s), the UAV(s) may be autonomously controlled or may be controlled remotely. Each of the set of aerial vehicles 103 may be configured with one or more image sensors that may be capable of capturing digital image data, where the image sensor(s) may be controlled autonomously, or locally or remotely by an individual. It should be appreciated that each of the set of aerial vehicles 103 may be configured with one of more image sensors, video recorders, and/or cameras. In some embodiments, each of the set of aerial vehicles 103 may be configured with a memory device for storing any image data. FIG. 1 depicts two aerial vehicles 103, however it should be appreciated that fewer or more aerial vehicles are envisioned.

In operation, the image sensor(s) (or cameras) of the set of aerial vehicles 103 may be configured to capture digital images that depict various portions of the property(ies) 102. In particular, the digital images may depict exterior portions of the property(ies) 102, such as roofs, entryways, exterior materials, foundations, yards, auxiliary buildings, and/or any other physical structures or elements associated with the property(ies) 102 that may be visible.

In addition to aerial digital images of a property 102 captured by one or more drones or aerial vehicles 103, other digital images of a property 102 may be acquired. For instance, digital images of the property 102 may be acquired by one or more image sensors or cameras of a smart or autonomous vehicle 104, a vehicle dashboard mounted camera, a user mobile device 105, surrounding smart or intelligent homes 102, and/or additional source(s) 106 such as, for example, internet websites or social networking services. In embodiments, the acquired digital images associated with a property 102 may be organized into a data set for the property 102 and transmitted to a processor via a network(s) 110 for analysis.

Further, the system 100 may also include a processing server 115 and a set of retail terminals 112 that may be in communication via the one or more networks 110. In certain embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The processing server 115 may be configured to interface with or support a memory or storage 113 capable of storing various data. In a particular embodiment, the memory or storage 113 may store customer account data associated with accounts of the retail terminal(s) 112. As depicted in FIG. 1, the processing server 115 and/or the retail terminal(s) 112 may be configured to communicate with the set of aerial vehicles 103 via the network(s) 110.

According to embodiments, the retail terminal(s) 112 may be associated with an entity, business, company, enterprise, operation, individual, or the like, that may offer or provide goods or services for customers or clients. For example, one of the retail terminals 112 may be associated with an internet service provider (ISP), another of the retail terminals 112 may be associated with a roofing service, and another of the retail terminals 112 may be associated with an insurance provider. In certain embodiments, the processing server 115 may be affiliated with or unaffiliated with the retail terminal(s) 112.

In one implementation, the processing server 115 may be incorporated into any of the retail terminal(s) 112. In another implementation, the processing server 115 may be separate from the retail terminal(s) 112, where the retail terminal(s) 112 may have an existing agreement, contract, or partnership with the processing server 115. FIG. 1 depicts two retail terminals 112, however it should be appreciated that fewer or more retail terminals are envisioned.

In operation, the image sensor(s) (or cameras) of the aerial vehicle(s) 103 may capture digital image data that depicts various portions of the property(ies) 102 and may transmit the digital image data to the processing server 115 via the network(s) 110. The digital image data may include a set of digital images and/or digital videos having a set of image capture parameters associated with how the digital image data was captured and/or with the conditions or environment associated with the capture of the digital image data.

After receiving the digital image data, the processing server 115 may compare the set of image capture parameters to a set of baseline image capture parameters. Based upon the comparison, the processing server 115 may determine whether the digital image data is consistent with the set of baseline image capture parameters (i.e., whether the digital image data is suitable for analysis and/or further processing). If the processing server 115 determines that the digital image data is consistent with the set of baseline image capture parameters, the processing server 115 may perform further analyses or processing of the digital image data, including communication with the set of retail terminals 112 or other functionality. If the processing server 115 determines that the digital image data is not consistent with the set of baseline image capture parameters, the processing server 115 may generate and transmit an instruction or notification to at least one of the set of aerial vehicles 103 to cause the at least aerial vehicle 103 to capture additional image data that the processing server 115 may subsequently analyze for consistency with the set of baseline image capture parameters. These and additional functionalities are described in further detail with respect to FIG. 2.

Exemplary Signal Diagram for Ensuring Image Consistency

Figure 2:
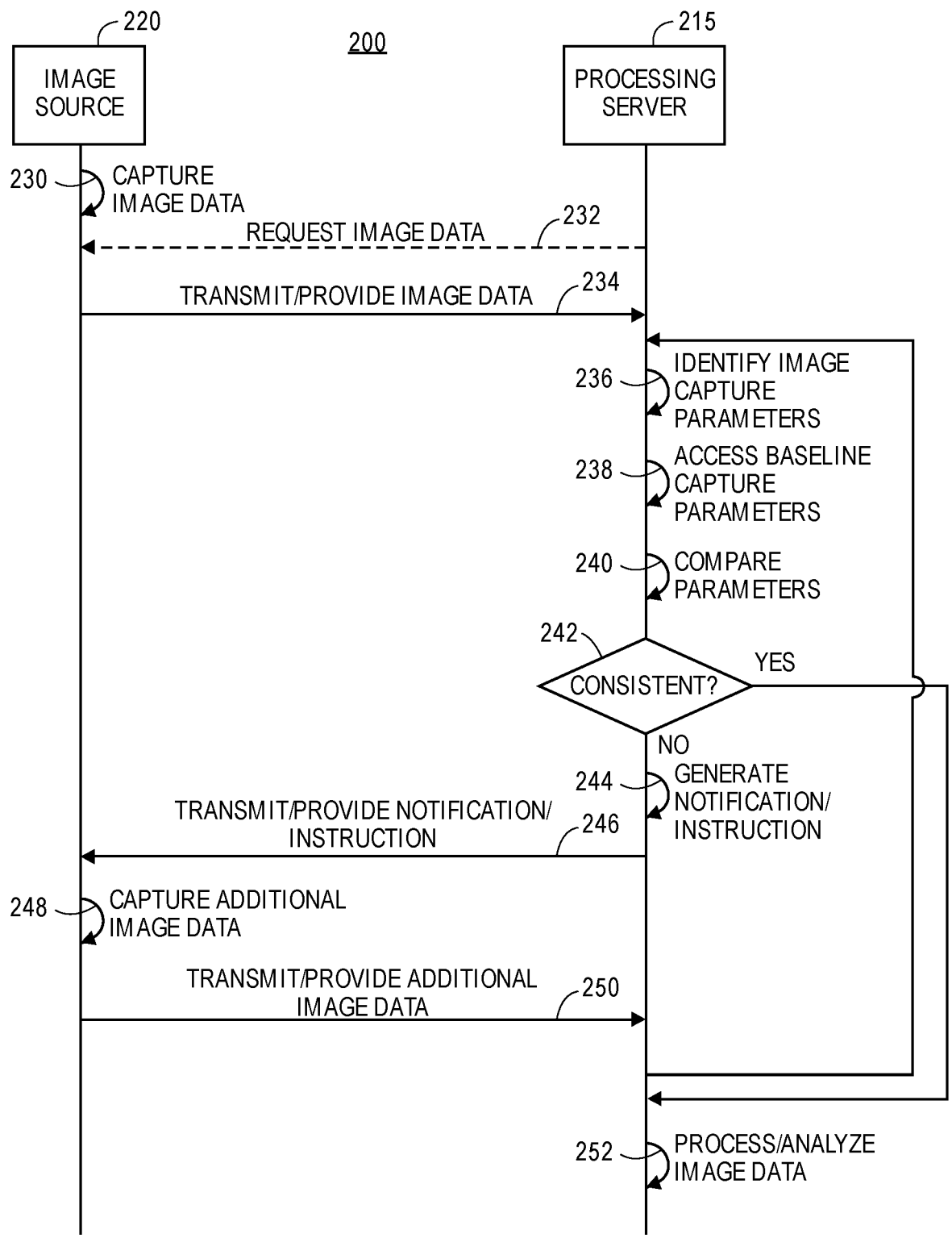
FIG. 2 depicts an exemplary signal diagram associated with analyzing image data to ensure image capture consistency, in accordance with some embodiments.

FIG. 2 depicts a signal diagram 200 associated with certain functionalities related to analyzing image data to automatically ensure consistent image capture parameters. The signal diagram 200 may include various components including: an image source 220 (such as one of the image sensors or cameras of the aerial vehicle(s) 103 and/or other image sensors as discussed with respect to FIG. 1) and a processing server 215 (such as the processing server 115 as discussed with respect to FIG. 1). Although FIG. 2 depicts the processing server 215 as performing various of the image analyses and other processing elements, it should be appreciated that the functionalities may be performed by any combination of the image source 220 and the processing server 215.

The signal diagram 200 may begin when the image source 220 captures (230) image data. According to some embodiments, the image data may be digital image data that consists of aerial image data of an area in which a set of properties may be located. In one implementation, there may be one or more of the image source 220, where the image source(s) 220 may be associated with a manned or unmanned aerial vehicle capable of airborne flight. Other image sources may be used, such as home-mounted, vehicle-mounted, and/or mobile device-mounted image sources or cameras. In one optional implementation, the image source 220 may access image data that was previously captured by the image source 220 itself or by another component. The image source 220 may be configured to store the image data, such as in a memory component.

In one optional implementation, the processing server 215 may request (232) image data from the image source 220. According to embodiments, the processing server 215 may automatically request the image data periodically (e.g., once every ten seconds, once every minute, once every hour), or a user of the processing server 215 may cause the processing server 215 to request the image data. Additionally, the processing server 215 may request specific image data, such as image data captured within a specified timeframe, image data of a specific location or area, and/or image data according to other parameters.

After the image source 220 captures or otherwise accesses the image data, or receives a request from the processing server 215, the image source 220 may transmit (234) or provide the image data to the processing server 215. In certain embodiments, the image source 220 may transmit the image data via any type of network connection, and optionally according to any request received from the processing server 215.

After receiving the image data, the processing server 215 may identify (236), from the image data, a set of image capture parameters. It should be appreciated that the processing server 215 may use any type of image processing, machine learning, or computer vision process, technique, calculation, algorithm, and/or the like to analyze the image data. In one implementation, the processing server 215 may be configured to analyze the image data to identify or recognize certain objects, as well as portions or sections of the objects, that may be depicted in the image data.

According to some embodiments, the set of image capture parameters may be associated with how the digital image data was captured and/or with the conditions or environment associated with the capture of the digital image data. For example, the set of image capture parameters may include an elevation, a distance from the object(s) depicted in the image data, weather information (e.g., visibility, humidity, temperature, wind speed and direction, air pressure), resolution, type of image capture component (e.g., drone, satellite, etc.), exposure, aperture, contrast, clarity, sharpness, saturation, highlights, shadows, temperature, tint, vignette, grain, fade, shadows, and/or the like. The set of image capture parameters may include values or metrics for any or all of the parameters identified herein. For example, an aerial image may have been captured by a drone (i.e., type of image capture component) and may have an elevation parameter of 850 m.

In one implementation, the processing server 215 may access (or the image data may include) various sensor data that may indicate a portion of the image capture parameters. For example, the processing server 215 may access an altimeter reading that indicates an elevation at which the digital image data was captured.

The set of image capture parameters may be determined from the image data itself, may be included in metadata associated with the image data, may be locally stored or accessed, and/or may be accessed from a third party source (e.g., a weather source). It should be appreciated that the processing server 215 may identify a portion or all of the available image capture parameters. Further, in cases in which the image data includes multiple images, each image may have different image capture parameters present as well as different values or metrics for the image capture parameters.

The processing server 215 may access (238) a set of baseline image capture parameters. According to some embodiments, the set of baseline image capture parameters may include values or metrics (or ranges of values or metrics) for any or all of the parameters identified herein (e.g., an elevation, a distance from the object(s) depicted in the image data, weather information (e.g., visibility, humidity, temperature, wind speed and direction, air pressure), resolution, type of image capture component (e.g., drone, satellite, etc.), exposure, aperture, contrast, clarity, color scheme, sharpness, saturation, highlights, shadows, temperature, tint, vignette, grain, fade, shadows, and/or the like). For example, a distance to target parameter may specify that an aerial image should be captured from between 80 m-200 m. For further example, a resolution parameter may specify that an aerial image should have a minimum resolution of 1.0 Megapixels. In certain embodiments, the processing server 215 may access any baseline capture parameters that match those that are included in the set of image capture parameters.

It should be appreciated that the set of baseline image capture parameters may vary based upon certain factors (e.g., location, weather conditions, time of day, time of year, day of week, etc.). For example, the acceptable elevation for image capture may be different for images captured in Denver than it is for images captured in New York City. For further example, the acceptable image brightness may be different for images captured after dusk than it is for images captured in daylight. Accordingly, the baseline capture parameters that the processing server 215 accesses may vary based upon one or more of these factors.

The processing server 215 may compare (240) the set of image capture parameters included in the image data to the set of baseline image capture parameters. In particular, the processing server 215 may compare each of the set of image capture parameters to the corresponding baseline image capture parameter to calculate a difference (e.g., an absolute difference or a percentage difference). Additionally or alternatively, the processing server 215 may determine whether each of the set of image capture parameters meets a requirement, threshold, amount, or range of the corresponding baseline image capture parameter. For example, if a color scheme baseline parameter requires that an aerial image be in color, and an aerial image is in black and white, then the color scheme parameter of the aerial image does not meet the corresponding baseline parameter.

The processing server 215 may determine (242) whether the set of image capture parameters included in the image data is consistent with the set of baseline image capture parameters. In a particular implementation, the processing server 215 may determine whether all of the set of image capture parameters are consistent with the corresponding baseline image capture parameters; and if any of the set of image capture parameters is not consistent, then the processing server 215 may deem that the set of image capture parameters is not consistent (and vice-versa). In another implementation, the processing server 215 may determine whether a certain amount or percentage of the set of image capture parameters is consistent, and if so, then the processing server 215 may deem that the set of image capture parameters is consistent (and vice-versa). In a further implementation, the processing server 215 may determine whether the values or metrics of the set of image capture parameters (or a portion thereof) is within a certain amount or percentage of the corresponding values or metrics of the set of baseline image capture parameters, and if so, then the processing server 215 may deem that the set of image capture parameters is consistent (and vice-versa). It should be appreciated that the processing server 215 may employ additional or alternative techniques, algorithms, calculations, or the like to determine consistency or compliance.

If the processing server 215 determines that the set of image capture parameters included in the image data is consistent with the set of baseline image capture parameters ("YES"), processing may proceed to 252. In contrast, if the processing server 215 determines that the set of image capture parameters included in the image data is not consistent with the set of baseline image capture parameters ("NO"), the processing server 215 may generate (244) a notification or instruction that may indicate the inconsistency or non-compliance. In some embodiments, the instruction may be executable by a component (e.g., the image source 220) to cause the component to automatically capture additional image data, and/or to adjust certain parameters or settings to achieve consistency or compliance.

For example, if the processing server 215 determines that the image data was captured at too great of a distance to the target, then the instruction may cause the image source 220 to automatically relocate to a lesser (and compliant) distance to the target. For further example, if the processing server 215 determines that the image data is not of a minimum required resolution, then the instruction may cause the image source 220 to automatically adjust its resolution to at least meet the minimum required resolution.

The processing server 215 may transmit or provide (246) the notification or instruction to the image source 220. In certain embodiments, the processing server 215 may transmit the notification or instruction via any type of network connection. In one implementation, the processing server 215 may transmit the notification or instruction to a component that may control the image source 220, such as a remote control entity. In some embodiments in which the processing server 215 sends a notification, the image source 220 (or a component that controls the image source 220) may display the notification for review by an individual.

Accordingly, the individual may cause the image source 220 to make certain adjustments such that additional image data may comply or be consistent with the set of baseline image capture parameters.

In embodiments in which the processing server 215 sends an instruction, the image source 220 may execute the instruction to automatically initiate appropriate adjustments. For example, the images source 220 executing the instruction may cause a drone including the image source 220 to adjust to a distance of 100 m from a target.

The image source 220 may capture (248) additional image data, such as after optionally implementing any changes or modifications that may be included in the notification or instruction. After the image source 220 captures or otherwise accesses the additional image data, the image source 220 may transmit (250) or provide the additional image data to the processing server 215 via any type of network connection.

At 252, the processing server 215 may process or analyze the image data (or the additional image data). It should be appreciated that the processing server 215 may perform any type of processing or analysis on the image data, as well as interface with additional components and entities (e.g., the set of retail terminals 112 as discussed with respect to FIG. 1), to provide the additional components and entities with certain results of the processing or analysis. For example, the processing server 215 may determine a set of information about a set of properties depicted in the image data (or the additional image data), and transmit the set of information to the set of retail terminals 112.

Exemplary Notification Interfaces

Figure 4:
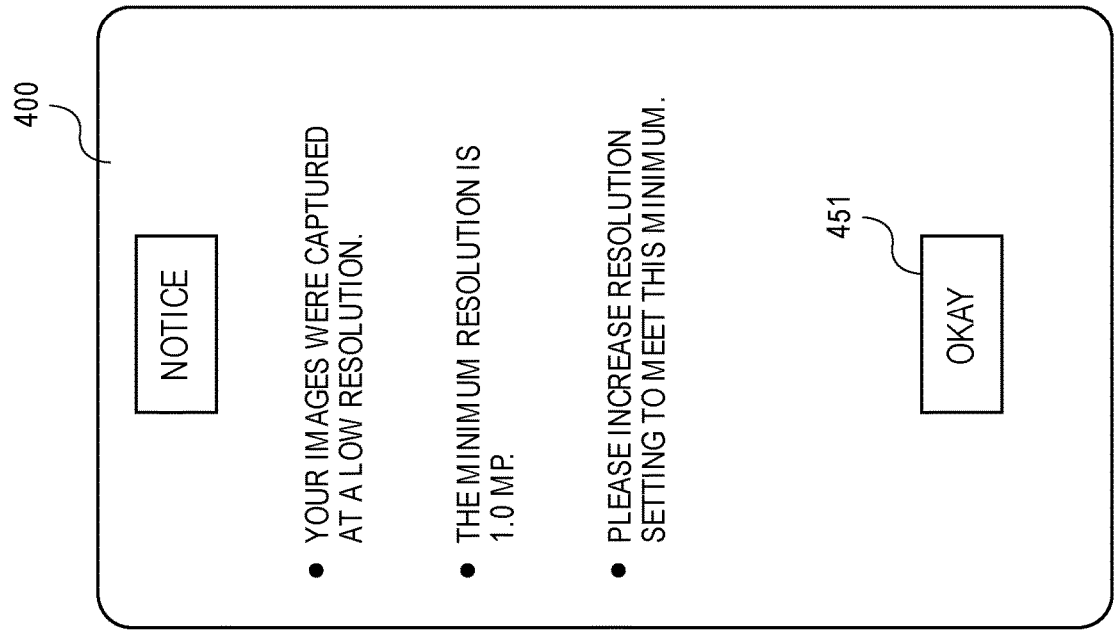
FIGS. 3 and 4 depict exemplary interfaces indicating image capture inconsistencies, in accordance with some embodiments.
Figure 3:
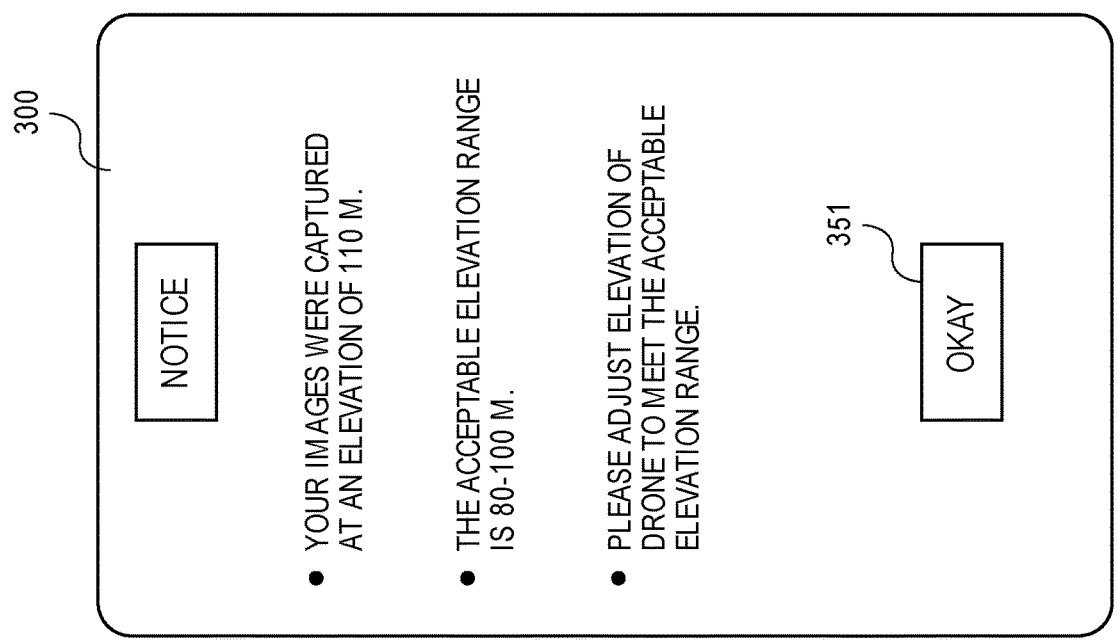

FIGS. 3 and 4 illustrate exemplary interfaces depicting notifications resulting from digital image analyses. An electronic device (e.g., a mobile device, such as a smartphone, smart watch, wearable, or a computer terminal) may be configured to display the interfaces and/or receive selections and inputs via the interfaces. For example, a dedicated application that is configured to operate on the electronic device may display the interfaces. The electronic device may be associated with a component configured to capture digital images, where a user of the electronic device may review the information of the interfaces and facilitate appropriate adjustments. It should be appreciated that the interfaces are merely examples and that alternative or additional content is envisioned.

FIG. 3 depicts an interface 300 including a notification related to an analysis of digital image data, where the notification indicates that the digital image data is not consistent with baseline parameters. In particular, the interface 300 indicates that the images were captured at an elevation of 110 m, but that the acceptable elevation range for image capture is 80-100 m. The interface 300 advises that the elevation of the image capture component (here, a drone) should be adjusted to meet the acceptable elevation range.

FIG. 4 depicts another interface 400 including a notification related to an analysis of digital image data, where the notification indicates that the digital image data is not consistent with baseline parameters. In particular, the interface 400 indicates that the images were captured at a low resolution, and that the minimum resolution is 1.0 MP. The interface 400 advises that the resolution setting of the image capture component (here, a drone) should be adjusted to meet the minimum.

Exemplary Flow Chart for Ensuring Consistent Image Parameters

Figure 5:
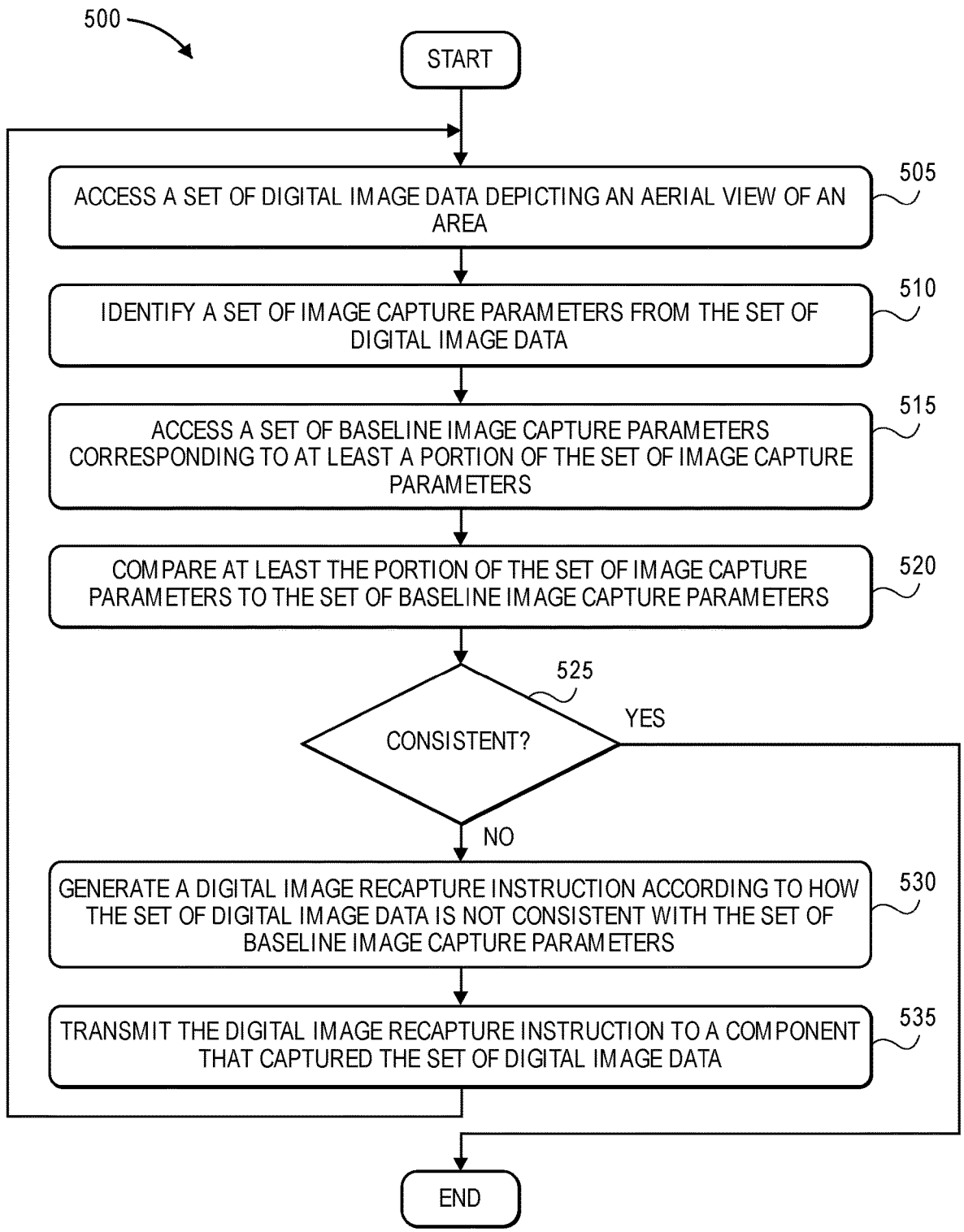
FIG. 5 is an exemplary flow diagram associated with analyzing image data to automatically ensure consistent image capture parameters, in accordance with embodiments.

FIG. 5 depicts a block diagram of an exemplary computer-implemented method 500 of analyzing image data to automatically ensure consistent image capture parameters. The method 500 may be facilitated by a processing server (such as the processing server 115) that may communicate with a set of image capture components and various other data sources or components via one or more network connections.

The method 500 may begin with the processing server accessing (block 505) a set of digital image data that may depict an aerial (or side, ground, or other) view of an area. For instance, the digital image data may include aerial digital images or image data acquired via one or more drones. The digital image data may or may not also include digital images or image data acquired via one or more home-mounted, vehicle-mounted, and/or mobile device-mounted image sensors or cameras.

In certain embodiments, the area may include at least a portion of a neighborhood, region, zone, and/or the like, that may be populated by a set of properties or other physical structures. The processing server may access the set of digital image data locally, or may request and/or receive the set of digital image data from a component that captured the set of digital image data, or from a component configured to communicate with an image sensor that captured the set of digital image data.

The processing server may identify (block 510) a set of image capture parameters from the set of digital image data. In some embodiments, the set of image capture parameters may include values or metrics (or ranges of values or metrics) for any or all of the parameters identified herein (e.g., an elevation, a distance from the object(s) depicted in the image data, weather information (e.g., visibility, humidity, temperature, wind speed and direction, air pressure), resolution, type of image capture component (e.g., drone, satellite, etc.), exposure, aperture, contrast, clarity, color scheme, sharpness, saturation, highlights, shadows, temperature, tint, vignette, grain, fade, shadows, and/or the like).

The processing server may access (block 515) a set of baseline image capture parameters corresponding to at least a portion of the set of image capture parameters. In some embodiments, the set of baseline image capture parameters may have values or metrics, or ranges of values or metrics, that may be considered acceptable, a minimum, a maximum, or another designation. The processing server may access those baseline parameters that correspond to the set of image capture parameters identified in block 510 that include a value or metric.

The processing server may compare (block 520) at least the portion of the set of image capture parameters to the set of baseline image capture parameters. In some embodiments, the processing server may, for each of the at least the portion of the set of image capture parameters, calculate a difference between the image capture parameter and the corresponding baseline image capture parameter.

The processing server may determine (block 525) whether the set of digital image data is consistent with the set of baseline image capture parameters. In embodiments, the processing server may determine that at least a portion of the set of calculated differences at least meets a threshold amount or percentage. It should be appreciated that the processing server may determine consistency according to other techniques, algorithms, calculations, and the like.

If the processing server determines that the set of digital image data is consistent with the set of baseline image capture parameters ("YES"), processing may end, repeat, or proceed to other functionality, such as performing various applications based upon the digital image data. If the processing server determines that the set of digital image data is not consistent with the set of baseline image capture parameters ("NO"), the processing server may generate (block 530) a digital image recapture instruction according to how the set of digital image data is not consistent with the set of baseline image capture parameters.

According to certain embodiments, the digital image recapture instruction may be in the form of a computer-executable instruction or a notification that may be displayable by a component (e.g., in a user interface). In one embodiment, the digital image recapture instruction may direct a drone or other source of aerial images or image data to take one or more new or additional aerial pictures or images. In one implementation, the processing server may determine a set of changes needed to be consistent with the set of baseline image capture parameters, and may generate the digital image recapture instruction according to the set of changes.

The processing server may transmit (block 535) the digital image recapture instruction to a component that captured the set of digital image data. In some embodiments, the component may instead be configured to communicate with an image sensor that captured the set of digital image data. After receiving the digital image recapture instruction, the component may execute the digital image recapture instruction to cause any changes or adjustments to be implemented, acquire one or more new or additional aerial or other images or pictures, and/or may display the digital image recapture instruction for review by an individual. After block 535, processing may return to block 505 at which the processing server may access an additional set of digital image data, presumably captured according to the digital image recapture instruction. The processing server may process the additional set of digital image data or images accordingly.

Exemplary Hardware Diagram

Figure 6:
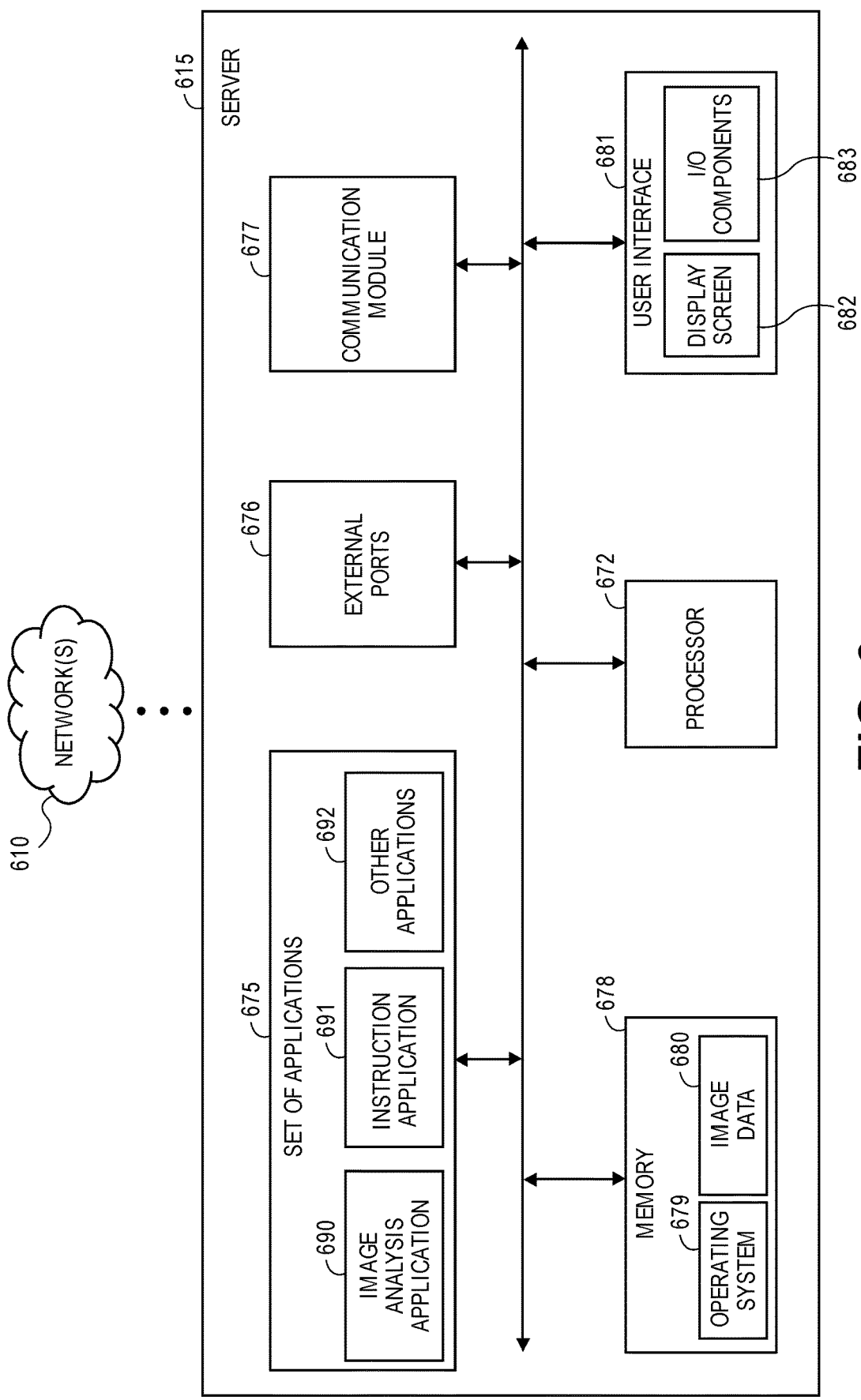
FIG. 6 is a block diagram of an exemplary computer server, in accordance with some embodiments.

FIG. 6 illustrates a diagram of an exemplary server 615 (such as the processing server 115 as discussed with respect to FIG. 1) in which the functionalities as discussed herein may be implemented. It should be appreciated that the server 615 may be configured to be connect to and communicate with various entities, components, and devices, as discussed herein.

The server 615 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be an image analysis application 690 configured to analyze images to assess parameter consistency, and an instruction application 691 configured to generate and transmit instructions and notifications according to parameter consistency analyses. It should be appreciated that one or more other applications 692 are envisioned.

The processor 672 may interface with the memory 678 to execute the operating system 679 and the set of applications 675. According to some embodiments, the memory 678 may also include image data 680 that the image analysis application 690 may access and analyze. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 677 configured to communicate data via one or more networks 610. According to some embodiments, the communication module 677 may include one or more transceivers (e.g., WWAN, WLAN, and/or WPAN transceivers) functioning in accordance with IEEE standards, 3GPP standards, or other standards, and configured to receive and transmit data via one or more external ports 676. For example, the communication module 677 may receive, via the network 610, digital image data captured by a set of components (e.g., image sensors, such as cameras or video recorders). For further example, the communication module 677 may transmit notifications and communications to various components via the network 610.

The server 615 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones). According to some embodiments, the user may access the server 615 via the user interface 681 to review information and/or perform other functions. In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 672 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Exemplary Computer-Implemented Method

In one aspect, a computer-implemented method of analyzing image data to automatically ensure consistent image capture parameters may be provided. The method may include, via one or more processors, servers, transceivers, and/or sensors (1) accessing a set of digital image data depicting an aerial view of an area; (2) identifying a set of image capture parameters from the set of digital image data; (3) accessing a set of baseline image capture parameters corresponding to at least a portion of the set of image capture parameters; (4) comparing at least the portion of the set of image capture parameters to the set of baseline image capture parameters; (5) based upon the comparing, determining that the set of digital image data is not consistent with the set of baseline image capture parameters; and/or (6) in response to the determining, generating a digital image recapture instruction according to how the set of digital image data is not consistent with the set of baseline image capture parameters.

The method may further include transmitting the digital image recapture instruction to a component that captured the set of digital image data. Additionally or alternatively, the component that captured the set of digital image data may be configured to execute the digital image recapture instruction.

The method may further include (i) receiving, from the component, an additional set of digital image data; (ii) identifying an additional set of image capture parameters from the additional set of digital image data; (iii) comparing the additional set of image capture parameters to the set of baseline image capture parameters; and/or (iv) based upon the comparing, determining that the additional set of digital image data is consistent with the set of baseline image capture parameters.

The method may further include transmitting the digital image recapture instruction to a component configured to communicate with an image sensor that captured the set of digital image data. Generating the digital image recapture instruction may include generating a notification indicating how the set of digital images is not consistent with the set of baseline image capture parameters.

Generating the digital image recapture instruction may include determining a set of changes needed to be consistent with the set of baseline image capture parameters; and generating a computer-executable instruction according to the set of changes. Accessing the set of digital image data depicting the aerial view of the area may include receiving the set of digital image data from a component that captured the set of digital image data.

Comparing at least the portion of the set of image capture parameters to the set of baseline image capture parameters may include, for each of at least the portion of the set of image capture parameters, calculating a difference between the image capture parameter and the corresponding baseline image capture parameter.

Determining that the set of digital image data is not consistent with the set of baseline image capture parameters may include determining that at least a portion of the set of calculated differences at least meets a threshold amount or percentage.

Additional Considerations

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to certain functionalities or profiles, and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, drone data, smart or interconnected home data, autonomous or smart vehicle data, mobile device data, social media data, and/or other data, including the types of data discussed elsewhere herein, may be collected or received by an insurance provider remote server, such as via direct or indirect wireless communication or data transmission from a smart home controller, smart or autonomous vehicle, mobile device, other customer computing device, or customer social media content after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more modules of a computer system (e.g., a processor or a group of processors) may be configured by software (e.g., an application or application portion) as a module that operates to perform certain operations as described herein.

In various embodiments, a module may be implemented mechanically or electronically. Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules are temporarily configured (e.g., programmed), each of the modules need not be configured or instantiated at any one instance in time. For example, where the modules comprise a general-purpose processor configured using software, the general-purpose processor may be configured as respective different modules at different times. Software may accordingly configure a processor, for example, to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment. In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

This detailed description is to be construed as exemplary only and does not describe every possible embodiment, as describing every possible embodiment would be impractical, if not impossible. One could implement numerous alternate embodiments, using either current technology or technology developed after the filing date of this application. Upon reading this disclosure, those of skill in the art will appreciate still additional alternative structural and functional designs for system and a method for assigning mobile device data to a vehicle through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method of analyzing image data to automatically ensure consistent image capture parameters, the method comprising, via a processor:
   accessing a set of digital image data depicting an aerial view of an area, the set of digital image data captured at a time of day and at a location;
   identifying a set of image capture parameters from the set of digital image data;
   accessing, based on at least one of the time of day or the location at which the set of digital image data was captured, a set of baseline image capture parameters corresponding to at least a portion of the set of image capture parameters;
   comparing at least the portion of the set of image capture parameters to the set of baseline image capture parameters;
   based upon the comparing, determining that the set of digital image data is not consistent with the set of baseline image capture parameters; and
   in response to the determining, generating, by the processor, a digital image recapture instruction according to how the set of digital image data is not consistent with the set of baseline image capture parameters.

2. The computer-implemented method of claim 1, further comprising:
   transmitting the digital image recapture instruction to a component that captured the set of digital image data.

3. The computer-implemented method of claim 2, wherein the component that captured the set of digital image data is configured to execute the digital image recapture instruction.

4. The computer-implemented method of claim 2, further comprising:
   receiving, from the component, an additional set of digital image data;
   identifying an additional set of image capture parameters from the additional set of digital image data;
   comparing the additional set of image capture parameters to the set of baseline image capture parameters; and
   based upon the comparing of the additional set of image capture parameters, determining that the additional set of digital image data is consistent with the set of baseline image capture parameters.

5. The computer-implemented method of claim 1, further comprising:
   transmitting the digital image recapture instruction to a component configured to communicate with an image sensor that captured the set of digital image data.

6. The computer-implemented method of claim 1, wherein generating the digital image recapture instruction comprises:
   generating a notification indicating how the set of digital images is not consistent with the set of baseline image capture parameters.

7. The computer-implemented method of claim 1, wherein generating the digital image recapture instruction comprises:
   determining a set of changes needed to be consistent with the set of baseline image capture parameters; and
   generating a computer-executable instruction according to the set of changes.

8. The computer-implemented method of claim 1, wherein accessing the set of digital image data depicting the aerial view of the area comprises:
   receiving the set of digital image data from a component that captured the set of digital image data.

9. The computer-implemented method of claim 1, wherein comparing at least the portion of the set of image capture parameters to the set of baseline image capture parameters comprises:
   for each of at least the portion of the set of image capture parameters, calculating a difference between the image capture parameter and the corresponding baseline image capture parameter.

10. A system for analyzing image data to automatically ensure consistent image capture parameters, comprising:
    a memory configured to store non-transitory computer executable instructions; and
    a processor interfacing with the memory, and configured to execute the non-transitory computer executable instructions to cause the processor to:
      access a set of digital image data depicting an aerial view of an area, the set of digital image data captured at a time of day and at a location,
      identify a set of image capture parameters from the set of digital image data,
      access, based on at least one of the time of day or the location at which the set of digital image data was captured, a set of baseline image capture parameters corresponding to at least a portion of the set of image capture parameters,
      compare at least the portion of the set of image capture parameters to the set of baseline image capture parameters,
      based upon the comparing, determine that the set of digital image data is not consistent with the set of baseline image capture parameters, and
      in response to the determining, generate a digital image recapture instruction according to how the set of digital image data is not consistent with the set of baseline image capture parameters.

11. The system of claim 10, further comprising:
    a transceiver configured to communicate via at least one network connection; wherein the processor is configured to execute the non-transitory computer executable instructions to further cause the processor to:
    transmit, via the transceiver, the digital image recapture instruction to a component that captured the set of digital image data.

12. The system of claim 11, wherein the component that captured the set of digital image data is configured to execute the digital image recapture instruction.

13. The system of claim 11, wherein the processor is configured to execute the non-transitory computer executable instructions to further cause the processor to:
    receive, from the component via the transceiver, an additional set of digital image data,
    identify an additional set of image capture parameters from the additional set of digital image data,
    compare the additional set of image capture parameters to the set of baseline image capture parameters, and based upon the comparing of the additional set of image capture parameters, determine that the additional set of digital image data is consistent with the set of baseline image capture parameters.

14. The system of claim 10, further comprising:

a transceiver configured to communicate via at least one network connection; wherein the processor is configured to execute the non-transitory computer executable instructions to further cause the processor to:

transmit, via the transceiver, the digital image recapture instruction to a component configured to communicate with an image sensor that captured the set of digital image data.

15. The system of claim 10, wherein to generate the digital image recapture instruction, the processor is configured to:

generate a notification indicating how the set of digital images is not consistent with the set of baseline image capture parameters.

16. The system of claim 10, wherein to generate the digital image recapture instruction, the processor is configured to:

determine a set of changes needed to be consistent with the set of baseline image capture parameters, and generate a computer-executable instruction according to the set of changes.

17. The system of claim 10, wherein to access the set of digital image data depicting the aerial view of the area, the processor is configured to:

receive the set of digital image data from a component that captured the set of digital image data.

18. The system of claim 10, wherein to compare at least the portion of the set of image capture parameters to the set of baseline image capture parameters, the processor is configured to:

for each of at least the portion of the set of image capture parameters, calculate a difference between the image capture parameter and the corresponding baseline image capture parameter.

* * * * *